(12) United States Patent
Farha et al.

(10) Patent No.: US 7,931,815 B2
(45) Date of Patent: Apr. 26, 2011

(54) METHOD FOR REDUCING OXYGEN CONTENT OF FLUID STREAMS CONTAINING SULFUR COMPOUNDS

(75) Inventors: Floyd E. Farha, Oklahoma City, OK (US); James A. Kane, Casper, WY (US)

(73) Assignee: New Technology Ventures, INc., Oklahoma City, OK (US)

( * ) Notice: Subject to any disclaimer, the term of this patent is extended or adjusted under 35 U.S.C. 154(b) by 40 days.

(21) Appl. No.: 11/929,258

(22) Filed: Oct. 30, 2007

(65) Prior Publication Data

US 2010/0126346 A9    May 27, 2010

Related U.S. Application Data

(63) Continuation-in-part of application No. 11/228,713, filed on Sep. 15, 2005, now Pat. No. 7,744,841.

(51) Int. Cl.
    *C02F 1/72* (2006.01)
(52) U.S. Cl. ... 210/757; 423/219; 423/231; 423/243.07; 95/138
(58) Field of Classification Search ............ 210/749, 210/757–758; 95/230; 423/219, 243.07
    See application file for complete search history.

(56) References Cited

U.S. PATENT DOCUMENTS

| | | | | |
|---|---|---|---|---|
| 2,433,426 A * | 12/1947 | Capell et al. | | 252/190 |
| 2,503,528 A * | 4/1950 | Walker et al. | | 423/225 |
| 2,897,150 A * | 7/1959 | Bencowitz | | 210/711 |
| 3,199,946 A * | 8/1965 | Fujita et al. | | 423/230 |
| 3,618,667 A * | 11/1971 | Snavely, Jr. | | 166/310 |
| 3,666,404 A * | 5/1972 | Hwa et al. | | 422/18 |
| 4,008,775 A | 2/1977 | Fox | | |
| 4,061,716 A * | 12/1977 | McGauley | | 423/244.06 |
| 4,101,635 A * | 7/1978 | Nambu et al. | | 423/244.1 |
| 4,344,842 A | 8/1982 | Fox | | |
| 4,366,131 A | 12/1982 | Fox | | |
| 4,376,032 A * | 3/1983 | Givens | | 208/424 |
| 4,476,027 A | 10/1984 | Fox | | |
| 4,516,984 A * | 5/1985 | Warner et al. | | 95/46 |
| 4,629,571 A * | 12/1986 | Salem et al. | | 210/668 |
| 4,705,638 A | 11/1987 | Ganczarczyk | | |
| 4,753,722 A * | 6/1988 | Le et al. | | 208/207 |
| 4,956,160 A | 9/1990 | Reichert | | |
| 5,057,291 A * | 10/1991 | Fisher et al. | | 423/219 |
| 5,292,440 A * | 3/1994 | Hardison | | 210/712 |
| 5,466,381 A * | 11/1995 | Goliaszewski et al. | | 210/750 |
| 5,948,269 A * | 9/1999 | Stone | | 210/718 |
| 6,221,241 B1 | 4/2001 | Carnell et al. | | |
| 6,500,237 B2 | 12/2002 | Winchester et al. | | |
| 6,503,471 B1 * | 1/2003 | Han et al. | | 423/210 |
| 6,773,604 B2 * | 8/2004 | Walton et al. | | 210/710 |
| 7,342,145 B2 * | 3/2008 | Wu et al. | | 585/820 |
| 2003/0098281 A1 | 5/2003 | Shutt et al. | | |
| 2005/0006283 A1 | 1/2005 | Leung et al. | | |
| 2007/0060475 A1 * | 3/2007 | Farha | | 502/406 |

FOREIGN PATENT DOCUMENTS

WO    WO 2007/035435 A1    3/2007

OTHER PUBLICATIONS

Howard, Mike, et al, "Operating Experiences at Duke Energy Field Services Wilcox Plant with Oxygen Contamination and Amine Degradation".
Presented at the 51st Laurance Reid Gas Conditioning Conference, Feb. 25-28, 2001 at the University of Oklahoma.

* cited by examiner

*Primary Examiner* — Duane Smith
*Assistant Examiner* — Ives Wu
(74) *Attorney, Agent, or Firm* — Locke Lord Bissell & Liddell, LLP

(57) ABSTRACT

A method of using a sulfided iron reagent to remove oxygen from gaseous and liquid fluid streams such as natural gas, light hydrocarbon streams, crude oil, acid gas mixtures, carbon dioxide gas and liquid streams, anaerobic gas, landfill gas, geothermal gases and liquids, and the like is disclosed. In a preferred embodiment, the reagent is made by mixing, agglomerating and shaping finely powdered ferrous carbonate, preferably siderite which are used to remove oxygen from a hydrocarbon or carbon dioxide stream that also contains sulfur compounds such as hydrogen sulfide.

28 Claims, No Drawings

METHOD FOR REDUCING OXYGEN CONTENT OF FLUID STREAMS CONTAINING SULFUR COMPOUNDS

CROSS-REFERENCE TO RELATED APPLICATIONS

This application is a continuation-in-part of copending U.S. application Ser. No. 11/228,713, filed Sep. 15, 2005 now U.S. Pat. No. 7,744,841, published as US 2007/0060475 A1 on Mar. 15, 2007, and claims priority therefrom under 35 U.S.C. §120.

BACKGROUND OF THE INVENTION

1. Field of the Invention

This invention relates to a method for using a reagent composition for removing oxygen from a variety of fluids, and particularly from liquid and gaseous hydrocarbons and carbon dioxide. The method is especially useful for removing oxygen from gaseous hydrocarbon streams, light liquid hydrocarbon streams such as natural gas liquids ("NGL"), crude oil, acid-gas mixtures, carbon dioxide gas and liquid, anaerobic gas, landfill gas, geothermal gas, and the like.

2. Description of Related Art

At times oxygen is present as a contaminant in various gaseous and liquid hydrocarbon and carbon dioxide streams. In some cases, the oxygen is the result of a natural gas field that is contaminated with oxygen. Oxygen is often unintentionally introduced through processing of the gaseous hydrocarbon streams. One example of this is when a compressor is used to increase the pressure of low pressure gas, such as coal seam or landfill gas. Small amounts of air, containing oxygen, can find its way into the gas stream during the compression process.

The presence of oxygen in gaseous and liquid hydrocarbon streams such as a natural gas stream can cause various problems. The oxygen will increase the amount and rate of corrosion in pipelines as well as treatment and storage facilities. It can also interfere with further treatment of the gas stream. Particularly, the presence of oxygen will degrade amine solvents that are used to remove hydrogen sulfide from a natural gas stream. This makes it difficult to remove hydrogen sulfide from various hydrocarbon streams that also contains oxygen. Removal of hydrogen sulfide and other sulfur compounds from these streams is required to meet the stringent sulfur requirements under modern environmental laws and regulations.

In fact, many pipeline companies will discount the value of a natural gas stream that contains high levels of oxygen or may even refuse to accept natural gas streams that contain more than a certain level of oxygen. Many pipeline specifications require natural gas to contain less than 10 ppm of oxygen. The use of oxygen removal systems for gaseous hydrocarbon streams is not widespread and there is a lack of an economical way to remove low levels of oxygen from natural gas streams. In many cases, a natural gas stream that contains high amounts of oxygen may be abandoned or blended with other streams to drop the oxygen content below the required specifications for pipelines.

Gaseous and liquid hydrocarbon streams also often contain significant quantities of sulfur compounds. Various sulfur compounds that are often found in gaseous hydrocarbon streams such as natural gas streams include hydrogen sulfide, mercaptans, and dimethyidisulfide. These sulfur compounds must be removed from the hydrocarbon stream in order to meet emissions standards and pipeline requirements. However, the presence of oxygen in the gaseous stream inhibits the removal of the sulfur compounds. Therefore, there is still a need for an economical way to remove oxygen from gaseous hydrocarbon streams, especially those streams that also contain sulfur containing compounds such as hydrogen sulfide.

SUMMARY OF THE INVENTION

A method of using a reagent for removing oxygen from gaseous and liquid fluid streams such as natural gas, light hydrocarbon streams, crude oil, acid gas mixtures, carbon dioxide gas and liquid streams, anaerobic gas, landfill gas, geothermal gases and liquids, and the like is disclosed. A method of reducing the amount of oxygen in a hydrocarbon or carbon dioxide stream containing sulfur-containing compounds by contacting the stream with a sulfur activated reagent comprising ferrous carbonate is also disclosed. In a preferred embodiment, the reagent is made by mixing, agglomerating and shaping finely powdered ferrous carbonate, preferably siderite, which is used to remove oxygen from a hydrocarbon or carbon dioxide stream that also contains sulfur compounds such as hydrogen sulfide. The presence of sufficient amounts of hydrogen sulfide or other sulfur species in the gaseous stream activates and continuously regenerates the ferrous sulfide, thereby making the oxygen removal process continuous. Based on surface analysis, the oxygen is removed by oxidizing sulfur containing species such as hydrogen sulfide to produce a sulfate and elemental sulfur.

According to one embodiment of the invention, a reagent bed is disclosed for use in reducing the amount of oxygen from gas, liquid or mixed gas and liquid streams containing sulfur containing compounds. The reagent bed desirably comprises a three-dimensional array of closely spaced pellets, prills, or otherwise-manufactured aggregates comprising from about 50 to about 100 weight percent ferrous carbonate, most preferably in the form of particulate siderite (90% through 100 mesh) aggregated using a binder comprising from about two to about ten weight percent calcium aluminate cement. According to a particularly preferred embodiment of the invention, the absorbent comprises dried extrudates containing about 95 weight percent siderite and about 5 weight percent calcium aluminate cement.

According to another embodiment of the invention, a reagent material for removing oxygen from gaseous streams containing sulfur containing compounds is made by mixing about 94 parts by weight particulate siderite (90% through 100 mesh), about 6 parts calcium aluminate cement, and about 20 parts water; compacting the mixture by extrusion or otherwise to produce larger particles, pellets or prills, and thereafter drying the reagent for a sufficient time to reduce the moisture content to a moisture level less than about three weight percent and preferably about 1-2 weight percent. According to a particularly preferred embodiment of the invention, the reagent pellets have a diameter of about 3/16 inch, a length of about 5/16 inch, and are dried at about 120° F. for about four hours.

According to another embodiment of the invention, the amount of oxygen in a liquid, gas, or mixed gas and liquid stream comprising sulfur-containing compounds is reduced by causing the stream to pass through a reagent bed consisting essentially of particulate material comprising from about 70 to about 100 weight percent ferrous carbonate, preferably in the form of aggregated particulate siderite. The absorbent bed most preferably comprises a plurality of pellets comprising from about 70 to about 100 weight percent ferrous carbonate in combination with an amount of a binder such as calcium aluminate cement that is sufficient to hold the reagent in a desired physical configuration for a desired service life. It will be appreciated by those of ordinary skill in the art upon reading this disclosure that the amount of the inventive reagent that is needed in the absorbent bed will depend upon factors such as the reagent particle size, the bed density, the effective surface area of the reagent particles, the amount of reagent that is available to absorb the oxygen, the amount of sulfur-containing compounds in gas or liquid stream being processed, and the temperature, pressure, velocity and residence time of the gas or liquid stream being treated as it passes through the bed.

DESCRIPTION OF THE PREFERRED EMBODIMENTS

Applicant has discovered that oxygen can be removed from liquid and gaseous streams, particularly gaseous and liquid hydrocarbon and carbon dioxide streams by contacting the stream with a reagent comprising ferrous sulfide. The method can be performed by contacting the stream with ferrous sulfide or, preferably, ferrous sulfide reagent is formed "in situ" by contacting ferrous carbonate with a gaseous or liquid fluid that also contains sulfur containing compounds, particularly hydrogen sulfide.

Gaseous and liquid hydrocarbon streams, such as natural gas streams, often contain sulfur-containing compounds such as hydrogen sulfide in addition to lesser amounts of oxygen. Contacting a stream that contains sulfur-containing compounds such as hydrogen sulfide, with a ferrous carbonate reagent will convert the ferrous carbonate to ferrous sulfide. The ferrous sulfide can then remove oxygen that is present in the stream. As long as there is an excess of hydrogen sulfide present in the feed stream, which is often the case with hydrocarbon streams, ferrous sulfide is regenerated thereby rendering the process continuous. The remaining hydrogen sulfide and other sulfur-containing compounds can then be removed downstream without interference from the oxygen that was contained in the feed stream.

Without being limited to any mechanism, it is currently believed that hydrogen sulfide in the hydrocarbon gas stream reacts with the ferrous carbonate to form ferrous sulfide. The ferrous sulfide then reacts with oxygen in the gaseous hydrocarbon feed stream and additional hydrogen sulfide through a multi-step process to regenerate ferrous sulfide and produce elemental sulfur. It is currently believed that the oxygen in the fluid is converted to water during the process. The additional water is not likely to have a negative effect on the fluid stream as a small amount of water is already present in most hydrocarbon fluids and the amount of oxygen in the fluid stream is generally low. Based upon a surface analysis of used reagent that has been used, it appears that sulfate may play a role as an intermediate during the process and that the iron appears to go through a reduction and oxidation cycle.

In a particularly preferred embodiment, the ferrous sulfide is formed "in situ" by contacting ferrous carbonate with a gaseous hydrocarbon stream containing sulfur containing compounds, such as hydrogen sulfide. The preferred source of ferrous carbonate is Siderite, which predominantly comprises ferrous carbonate, and is usually found naturally in combination with some calcium, magnesium or manganese. For use in the compositions and various methods of the invention, the siderite can be sourced in the form of chunks, granules, or finely divided powder. If sourced in chunks, the chunks are desirably reduced to granules of a suitable size or powdered prior to use. For use in bed applications, extrudates, as described below, or comparably sized siderite granules obtained from natural ores are preferred. If siderite is sourced in the form of a finely ground powder, the powder is desirably agglomerated and extruded or otherwise shaped prior to use, except when intended for use in applications such as drilling muds, where the use of siderite powder is recommended without prior agglomeration to form larger particles.

In some cases, merely adding up to about 20 weight percent water to the siderite powder, with mixing, will provided sufficient agglomeration to permit powdered siderite to be extruded into pellets of suitable size or strands that, when dried and subsequently handled, will be friable or easily broken into granules that are satisfactory for use in absorption beds through which sulfur-containing liquids or gases can be passed or circulated for oxygen removal. In some cases, the use of a minor effective amount of a binder, most preferably a cementitious material as further described below may be desirable for use in agglomerating finely divided ferrous carbonate powders.

Although it will be appreciated upon reading this disclosure that ferrous carbonate can be synthesized, the use of ferrous carbonate obtained in naturally occurring siderite mineral ores is preferred for economic reasons. *Hawley's Condensed Chemical Dictionary* (*Twelfth Edition*) reports that siderite ores naturally occur in Vermont, Massachusetts, Connecticut, New York, North Carolina, Pennsylvania, Ohio and Europe.

Extrudates useful in the absorbent bed of the invention can be prepared by mixing powdered siderite with a minor effective amount, such as about 5-6 weight percent of the total, of a binder such as calcium aluminate cement or another similarly effective material that does not significantly detract from the ability of the siderite to react with sulfur or sulfur-containing compounds and remove oxygen from a gas or liquid stream. A preferred calcium aluminate cement for use in the invention is marketed under the trademark SECAR 41® by Lafarge Aluminate of Chesapeake, Va. According to a particularly preferred embodiment of the invention, about 6 parts by weight calcium aluminate cement is blended into about 94 parts by weight siderite powder (90% through 100 mesh) to distribute the cement throughout the siderite.

About 20 parts by weight water per 100 parts by weight of blended siderite and cement is desirably admixed with the solids to hydrate the binder and facilitate the formation of larger aggregates, which are then dried to desired moisture content. Most preferably, the siderite, cement and water mixture is extruded and chopped, such as by use of a rotary pelletizer, or otherwise divided or broken, into extrudates having a diameter of approximately $3/16$ inch and a length of approximately $5/16$ inch. The extrudates produced from powder as described above are desirably dried at a temperature of about 120° F. for about four hours. Although the required drying time can vary according to the size and dimensions of the pellets, the drying temperature and the humidity of the ambient air, the moisture content of the aggregated solids is desirably reduced to less than about three weight percent during the drying stage and most preferably to from about one to about two percent.

Varying amounts of water may be required if a process other than extrusion is used. For example about 10-12 parts by weight water per 100 parts by weight of blended siderite and cement is used when the mixture is processed into pellets using a California Pellet Mill. Other manufacturing techniques are known that require more, less, or even no water in order to form pellets or granules that can be used in the process.

The reagent and method disclosed herein are particularly effective for absorbing oxygen from natural gas, light hydrocarbon streams such as NGL, crude oil, acid gas mixtures, carbon dioxide gas and liquid, anaerobic gas, landfill gas, geothermal and other sulfur-containing streams. For most applications, the sulfur-containing fluid to be treated is passed through a bed of the subject reagent pellets or granules that are disposed inside a vessel such as a cylindrical tower. The amount of reagent that is needed in the reagent bed will depend upon many factors such as the sulfur and oxygen content in the feed fluid, the reagent particle size, the bed density, the effective surface area of the reagent particles, the amount of ferrous carbonate in the reagent that is available to react with the sulfur-containing compounds, and the temperature, pressure, velocity and residence time of the gas or liquid stream being treated as it passes through the bed.

Although extrudates having dimensions ranging from about 1/16 inch to about 1/4 inch are a particularly preferred form for use of the subject reagent, it will be appreciated that granules of suitable size can be produced by pulverizing siderite chunks in a hammer mill or by using other commercially available devices well known to those of ordinary skill in the art, and thereafter screening to a suitable particle size range preferably not exceeding about 5/16 inch. Similarly, where siderite powder or synthetically produced ferrous carbonate powder is the starting material, means other than extrusion can also be used for agglomerating or densifying the powder for use in various sulfur removal processes. Such other means include, for example, hydraulically actuated presses or other compaction devices. In most cases, minor effective amounts of a binder and water are desirably added to the powdered siderite or ferrous carbonate to facilitate agglomeration of the individual mineral particles into larger solid bodies, provided that the binder does not too greatly reduce the effective surface area of the reagent.

Representative Siderite Analysis

A processed siderite composition having a bulk density of 110 pounds per cubic foot, a specific gravity of 3.63 and a particle size of 90% through 100 mesh, has the following analysis:

|  | wt % |
| --- | --- |
| Fe (as elemental) | 43.00% |
| $FeCO_3$ | 86.87 |
| $SiO_2$ | 5.50 |
| $Al_2O_3$ | 1.30 |
| CaO | 0.56 |
| MgO | 0.53 |
| S | 0.40 |
| Mn | 0.35 |
| Cu | 0.30 |
| Co | 0.02 |

-continued

|  | wt % |
| --- | --- |
| Cd | 0.0041 |
| Pb | 0.0001 |
| As | 0.00005 |
| Sb | 0.00005 |
| $Fe_2O_3$ | <1.0 |

Sample A

To demonstrate the utility of the inventive method, a finely divided siderite powder (90% through 100 mesh) was blended with calcium aluminate cement in a ratio of 94 parts siderite to 6 parts cement by weight. Approximately 20 parts by weight water were blended with the siderite and cement mixture, and the mixture was then extruded to produce a plurality of extrudates having a diameter of about 3/16 inch and a length of about 1/4 inch. These extrudates were dried at 120 degrees F. for four hours to a moisture content of about 1-2 wt. %.

Ferrous carbonate reagent that has become blackened is believed to be caused by the formation of ferrous sulfide on the surface of the ferrous carbonate during the removal of sulfur. The ferrous sulfide can be regenerated by contacting the ferrous sulfide with an oxygen source, i.e., air and a sulfur source, i.e., hydrogen sulfide. Evidence of the formation of ferrous sulfide and the regeneration of ferrous carbonate can be seen in the applicant's co-pending applications U.S. application Ser. No. 11/228,713 and PCT/US06/035911. Alternatively, the ferrous sulfide that is formed can be used to remove even small amounts of oxygen that may be present in the fluid.

The usefulness of the ferrous carbonate reagent materials, when prepared as described above, as well as the usefulness of ferrous sulfide formed by contacting the ferrous carbonate with gas and liquid streams containing sulfur-containing compounds such as hydrogen sulfide to remove oxygen is further described and explained in relation to the examples presented below. The hydrogen sulfide concentration is reported in volume percent and the oxygen content is reported in parts per million by volume (PPMV).

EXAMPLE 1

A stream of methane contaminated with oxygen and hydrogen sulfide intended to simulate a typical natural gas stream, along with excess air, was passed through a 2" diameter by 8-10" high test treater bed containing a plurality of extruded ferrous carbonate reagent prepared according to Sample A. The fluid stream was charged to the treater bed at a rate measured in cubic feet per hour at standard conditions (SCFH), a temperature measured in degrees Fahrenheit, and at a pressure measured in pounds per square inch gauge (PSIG). The results of the test are shown in Table 1.

TABLE 1

| | | | | Hydrogen Sulfide | | | Oxygen | | |
| --- | --- | --- | --- | --- | --- | --- | --- | --- | --- |
| Sample | Inlet Temp. | Inlet Pressure | Gas Rate | Inlet % | Outlet % | % Removal | Inlet ppm | Outlet ppm | % Removal |
| 1 | 100 | 25 | 0.212 | 0.437 | <0.10 | >69% | 10,266.5 | 827.9 | 91% |
| 2 | 100 | 25 | 0.212 | 0.612 | 0.033 | 95% | 7,905.3 | 242.6 | 96% |
| 3 | 100 | 50 | 0.212 | 1.025 | 0.094 | 91% | 2,736.7 | 390.4 | 86% |
| 4 | 100 | 50 | 0.4 | 0.833 | 0.241 | 71% | 4,518.2 | 1,251.8 | 72% |
| 5 | 100 | 2 | 0.212 | 0.368 | 0.156 | 58% | 1,622.1 | 713.6 | 55% |
| 6 | 100 | 2 | 0.212 | 0.391 | 0.203 | 48% | 1,935.5 | 564.3 | 71% |

As can be seen from the results shown in Table 1, ferrous carbonate can be used to remove oxygen from a fluid stream that contains an excess of hydrogen sulfide. As discussed above, the ferrous carbonate is converted "in situ" to ferrous sulfide through a reaction with the hydrogen sulfide in the fluid stream. The ferrous sulfide is then believed to catalytically act to remove oxygen and a small amount of additional sulfur from the fluid stream. Elemental sulfur is detected as a product of the reaction. The oxygen is believed to be converted to water, which does not interfere with subsequent processing of the fluid and can be easily removed downstream to the extent necessary or desirable. As seen from the results shown in Table 1, the process does not require the use of high temperatures and/or pressures and is effective at even relatively mild conditions. It is also effective at removing oxygen even when it is present at the relatively high concentrations of 1% by volume (i.e. 10,000 ppm).

EXAMPLE 2

Natural gas was collected at the well head and compressed using a standard compressor system. A portion of the compressed gas was separated from the compressed gas line exiting the compressor and passed through a vertical treater bed that had a diameter of 2 inches and a height of 12 inches. The remainder of the compressed gas would normally be sent via a pipeline to a refinery or treatment facility. However, due to the unacceptably high levels of sulfur in the gas stream, and the fact that the sulfur could not be removed due to the presence of oxygen in the gas stream, the particular stream was burned off as waste during the testing period.

The treater bed was filled with approximately 0.0218 cubic feet of reagent prepared according to Sample A above. The feed stream was passed through the treater bed, without regenerating or replacing the reagent over a period of six days. Samples 1-3 were taken the first day, sample 4 was taken the second day, samples 5-7 were taken on the third day, samples 8-9 were taken the fourth day, samples 10-12 were taken the fifth day, and samples 13-19 were taken on the sixth day of the test. The levels of hydrogen sulfide and oxygen were determined using chromatography. Due to the fact that high levels of hydrogen sulfide can affect the detectors used to determine the oxygen concentration, the samples were scrubbed of hydrogen sulfide prior to their analysis for oxygen content. To verify that such scrubbing did not affect the measurements, samples 16-19 were analyzed without carrying out any scrubbing on the samples. As shown by comparing the results of samples 16-19 with the results of samples 13-15 taken the same day, the scrubbing of hydrogen sulfide from the sample did not measurably affect the amount of oxygen detected in the sample. The results of these tests are shown in Table 2. N/D indicates that the particular parameter was not measured for that particular sample.

TABLE 2

| Sample | Inlet Temp. | Inlet Pressure | Gas Rate | Hydrogen Sulfide % | | Oxygen ppm | |
|---|---|---|---|---|---|---|---|
| | | | | Inlet | Outlet | Inlet | Outlet |
| 1 | 78 | 25 | 0.6 | 1.25 | <0.10 | 18.8 | 5.6 |
| 2 | 81 | 27 | 0.6 | 1.1 | 0.55 | 20.5 | 6.2 |
| 3 | 90 | 25 | 0.6 | 1.25 | 1.0 | 133 | 3 |
| 4 | 85 | 32 | 0.5 | 1.35 | 1.3 | 11.7 | 1.1 |
| 5 | 83 | 33 | 0.5 | 1.1 | 0.8 | 12.3 | 0.7 |
| 6 | 88 | 22 | 0.55 | 1.3 | 0.7 | 6.2 | 1.0 |
| 7 | 91 | 23 | 0.55 | 1.35 | 1.25 | 9.1 | 0.9 |
| 8 | 91 | 17 | 0.6 | 1.25 | 1.15 | 5.1 | 0.9 |
| 9 | 90 | 18 | 0.8 | 1.25 | 1.15 | 5.1 | 0.9 |
| 10 | 90 | 20 | 0.8 | N/D | N/D | 4.8 | 0.8 |
| 11 | 90 | 20 | 0.75 | N/D | N/D | 4.1 | 0.8 |
| 12 | 88 | 19 | 0.72 | N/D | N/D | 3.8 | 0.7 |
| 13 | 87 | 17 | 0.7 | 1.225 | 1.225 | 4.1 | 0.8 |
| 14 | 90 | 33 | 0.7 | N/D | N/D | 78.6 | 0.7 |
| 15 | 90 | 23 | 0.7 | N/D | N/D | 6.8 | 0.8 |
| 16 | N/D | N/D | 0.7 | N/D | N/D | 63 | 1.2 |
| 17 | N/D | N/D | 0.7 | N/D | N/D | 66 | 0.8 |
| 18 | N/D | N/D | 0.7 | N/D | N/D | 78.3 | 0.7 |
| 19 | N/D | N/D | 0.7 | N/D | N/D | 78.7 | 0.7 |

As can be seen from the results shown in Table 2, the disclosed reagent and method is highly effective at removing oxygen from the gaseous hydrocarbon stream. After a short conditioning period, the amount of oxygen in the product fluid stream remained around 1 ppm regardless of the oxygen content of the feed stream, which ranged from around 4 ppm to above 78 ppm. The reason the first day of testing showed higher amounts of oxygen in the fluid product is likely because the ferrous carbonate was still in the process of being converted into ferrous sulfide by reacting with hydrogen sulfide in the fluid. This process involves not only the reaction of ferrous carbonate on the surface of the reagent, but also the migration of the ferrous sulfide into the interior of the reagent. The significant amounts of hydrogen sulfide that was removed from the fluid in the first three samples taken during the first day is evidence of this conditioning process. On the second and subsequent days, the process removes all but trace amounts of oxygen from the fluid and the amount of sulfur removal is less than 1 weight percent and ultimately drops below measurable amounts based upon the analytical technique that was used. This likely reflects that the reagent is mostly converted to ferrous sulfide and the amount of sulfur necessary to regenerate the ferrous sulfide is well below 1 weight percent when the amount of oxygen is below 78 ppm. The significant amount of sulfur containing compounds that remain in the fluid stream, as shown by the hydrogen sulfide measurements, does not present a problem because there are numerous known methods to remove the hydrogen sulfide and other sulfur compounds once the oxygen has been removed from the fluid. For example, a subsequent bed of ferrous carbonate that is periodically regenerated can be used to remove the remaining sulfur containing compounds as discussed in the applicant's co-pending applications referenced above.

It can also be seen in the results shown in Table 2 that the removal of oxygen can be successfully accomplished at or close to ambient temperature and do not require high temperatures or pressures. Instead, the oxygen removal process can be accomplished at the relatively mild conditions that are found after a gaseous hydrocarbon fluid is compressed to the higher pressures required to transport the gas through a pipeline to a refinery or treatment plant. This allows oxygen to be economically removed from the hydrocarbon fluid. It may be advantageous to use a higher pressure, however, at higher pressures the oxygen in the fluid becomes more corrosive and therefore a more significant problem. Plus, increasing the pressure of the fluid is likely to result in the introduction of additional oxygen from the compressor. As a result, it is preferred that the method is carried out at the pressure that the fluid is subsequently going to be transported and treated at to avoid additional compression after using the method to remove the oxygen from the fluid. The method can also be carried out at higher temperatures, however, above about 200° F. ferrous carbonate will start to break down, which may have a negative effect on the process. It is currently preferred to carry out the disclosed process at the temperature and pressure that the fluid is at or brought to for transport or other processing in order to avoid additional costs and equipment associated with changing these parameters.

The process is also shown to be continuous in the presence of excess hydrogen sulfide. The fact that the ferrous sulfide absorbent acts catalytically and does not require periodic regeneration or replacement to continue removing oxygen is a further advantage of the disclosed method. As long as there are more sulfur containing compounds such as hydrogen sulfide to convert the iron back to ferrous sulfide than oxygen that needs to be removed, no separate regeneration or activation step is required.

The above descriptions of certain embodiments are made for the purposes of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

What is claimed is:

1. A method for reducing the oxygen content of a nonaqueous fluid stream comprising gas, liquid or combined gas and liquid, and also comprising sulfur-containing compounds, the method comprising contacting the stream with sulfur-activated ferrous carbonate, wherein the sulfur-activated ferrous carbonate has a moisture content below about 3 weight percent where no additional water is added to the fluid stream and wherein any water present in the fluid stream does not have any effect on the removal of oxygen from the fluid stream.

2. The method of claim 1 wherein at least a portion of the one or more sulfur-containing compounds is also removed from the fluid stream.

3. The method of claim 1 wherein the sulfur-containing compounds include hydrogen sulfide.

4. The method of claim 1 wherein the fluid streams are selected from the group consisting of natural gas, light hydrocarbons, crude oil, acid gas mixtures, carbon dioxide, anaerobic gas, landfill gas, and geothermal gases and liquids.

5. The method of claim 3 comprising activating some of the ferrous carbonate with sulfur-containing compounds disposed in the fluid stream to convert some of the ferrous carbonate to ferrous sulfide, the amount of ferrous sulfide being sufficient to reduce the oxygen content of the stream.

6. The method of claim 5 wherein a portion of the oxygen content of the stream is converted to water.

7. The method of claim 5 wherein the fluid stream comprises a gaseous fluid and wherein elemental sulfur is produced when the ferrous sulfide reacts with oxygen and additional hydrogen sulfide.

8. The method of claim 1 wherein the ferrous carbonate is provided in the form of siderite.

9. The method of claim 8 wherein the siderite is provided in the form of particles, pellets or prills that also contain cement.

10. The method of claim 9 wherein the cement comprises calcium aluminate.

11. The method of claim 10 wherein the siderite is provided in a reagent bed comprising a three-dimensional array of closely spaced pellets or prills comprising from about 50 to about 100 weight percent particulate siderite aggregated using a binder comprising from about two to about ten weight percent calcium aluminate cement.

12. The method of claim 11 wherein the pellets or prills are made by mixing about 94 parts by weight particulate siderite and about 6 parts by weight calcium aluminate cement with about 20 parts by weight water, compacting the mixture and drying to a moisture level less than about three weight percent.

13. The method of claim 10 wherein 90% of the particulate siderite will pass through a 100 mesh screen.

14. A method for reducing the amount of oxygen in a liquid, gas, or mixed gas and liquid stream comprising sulfur-containing compounds by causing the stream to pass through a reagent bed consisting essentially of particulate material comprising from about 70 to about 100 weight percent ferrous carbonate and having a moisture content below about 3 weight percent and wherein the stream is substantially free of water.

15. The method of claim 14 wherein the ferrous carbonate is in the form of aggregated particulate siderite.

16. A method for reducing the oxygen content of a hydrocarbon fluid stream comprising gas, liquid, or combined gas and liquid, and also comprising sulfur-containing compounds, the method comprising:

contacting the stream with sulfur-activated ferrous carbonate;

wherein no additional water is added to the fluid stream; and wherein the fluid stream is substantially free of water.

17. The method of claim 16 wherein the fluid stream is natural gas.

18. The method of claim 16 wherein the fluid stream is reduced to less than about 1 ppm of oxygen.

19. The method of claim 16 wherein the sulfur-activated ferrous carbonate is formed by contacting the fluid stream containing sulfur-containing compounds with ferrous carbonate.

20. The method of claim 19 wherein the ferrous carbonate is provided in the form of siderite.

21. The method of claim 16 wherein:

the fluid is natural gas;

the sulfur-activated ferrous carbonate is formed by contacting the fluid stream containing sulfur-containing compounds with ferrous carbonate provided in the form of siderite;

the fluid stream is reduced to less than about 1 ppm of oxygen.

22. A method for reducing the oxygen content of a hydrocarbon fluid stream comprising gas, liquid, or combined gas and liquid, and also comprising sulfur-containing compounds, the method comprising:

contacting the stream with sulfur-activated ferrous carbonate; and wherein the fluid stream is reduced to less than about 1 ppm of oxygen.

23. The method of claim 22 wherein the fluid stream is natural gas.

24. The method of claim 22 wherein the fluid stream is substantially free of water.

25. The method of claim 22 wherein no additional water is added to the fluid stream.

26. The method of claim 22 wherein the sulfur-activated ferrous carbonate is formed by contacting the fluid stream containing sulfur-containing compounds with ferrous carbonate.

27. The method of claim 26 wherein the ferrous carbonate is provided in the form of siderite.

28. The method of claim 24 wherein:
the fluid is natural gas;
the sulfur-activated ferrous carbonate is formed by contacting the fluid stream containing sulfur-containing compounds with ferrous carbonate provided in the form of siderite;
no additional water is added to the fluid stream.

\* \* \* \* \*